Figure 1:
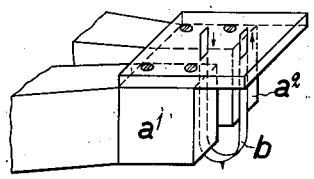

Feb. 8, 1927. 1,616,754
R. MECHAU
GALVANOMETER
Filed Sept. 29, 1921   2 Sheets-Sheet 1

Inventor:
Robert Mechau.

Patented Feb. 8, 1927.

1,616,754

UNITED STATES PATENT OFFICE.

ROBERT MECHAU, OF JENA, GERMANY, ASSIGNOR TO THE FIRM OF CARL ZEISS, OF JENA, GERMANY.

GALVANOMETER.

Application filed September 29, 1921, Serial No. 504,214, and in Germany October 18, 1920.

The object of the present invention is to provide a sensitive galvanometer which is sensitive in the highest possible degree especially to mechanical strains, concussions or the like.

According to the invention such a galvanometer is obtained by providing as a movable system a looped conductor, only fixed at both its ends, in connexion with a magnetic field, whereby the conductor is so disposed that the plane within which it travels is perpendicular to the magnetic lines. Such a movable system cannot, of course, be entirely disposed between the two poles of a magnet like the stretched conductor in string galvanometers because in the two halves of a loop the current flows in two directions being at least approximately opposite each other, so that, when disposing the whole loop between the two poles of a magnet, the loop would not receive an actuation of motion. With a view to imparting to the loop an actuation it may, e. g. be so disposed in the vicinity of a margin of the pole-shoes that of two parts of the loop, transversely to the direction in which the deflection of the loop is to take place, in which parts the current flows in approximately opposite directions, the one lies outside the magnetic field.

However, in order to produce the magnetic field two magnets should preferably be disposed side by side in such a manner that the magnetic lines of force between the poles of the one magnet are in the opposite direction to those between the poles of the other magnet, and furthermore the loop conductor should be so disposed that a part of the same transversely to the direction of deflection of the loop will be in the field of the one magnet and a second such part, in which the current flows at least approximately in the opposite direction as is the case in the first part, in the field of the second magnet. Thereby firstly a greater sensitiveness of the galvanometer than with the use of only one magnet can be obtained, and secondly it can be achieved that the property of the materials to be used for the manufacture of the loop conductor, viz, to be always more or less magnetic, either para- or diamagnetic, cannot have any detrimental effect. When using a single magnet for the production of the magnetic field the said property of these materials makes itself conspicuous in an objectionable way in so far as it creates with a currentless conductor an attraction or repulsion between the magnet and the loop and consequently the zero position of the loop and the amount of the deflection also depend on the material of which the loop consists.

In order to attain the largest possible sensitiveness the two fixing points of the loop should suitably be brought together as closely as possible with a view to thus minimizing the resistance of the loop to a deflection from its normally unenergized plane.

As a rule, the loop conductor is suspended, in which position a force, tending to restore the loop to its zero position, is exerted, in addition to the elasticity inherent to the loop by the weight of the latter. However, the arrangement may, e. g. be also made in such a way that the loop is in a horizontal position or that it is upwardly directed from the fixing place in a vertical plane. In both cases the weight of the loop does not have a restoring effect upon the loop, and in the last-mentioned case it even tends to an increase of the deflections. The position in space imparted to the loop from the outset is thus decisive for the amount of sensitiveness of the galvanometer. Hence, by causing the magnet system and the loop conductor to rotate about an axis which runs horizontally and parallelly to the loop plane, the sensitiveness of the galvanometer can be varied at will within certain limits by rotating the magnet system and the loop about this axis.

Additionally it is suitable to dispose the loop conductor rotatably about an axis which is perpendicular to the loop plane. It is thereby possible, apart from the case of the loop plane being horizontal, to effect in a simple manner, viz, by rotating the loop about this axis, a correction of the zero point.

Figures 2, 4:
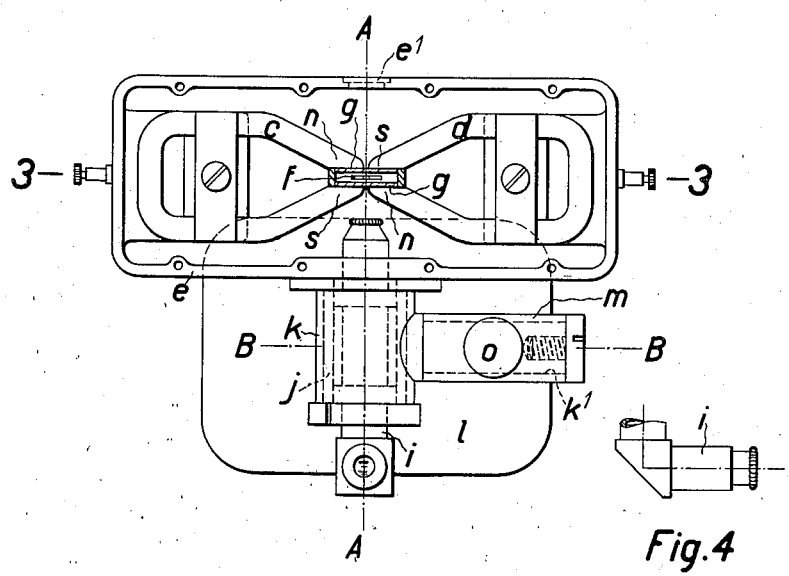
Figure 3:
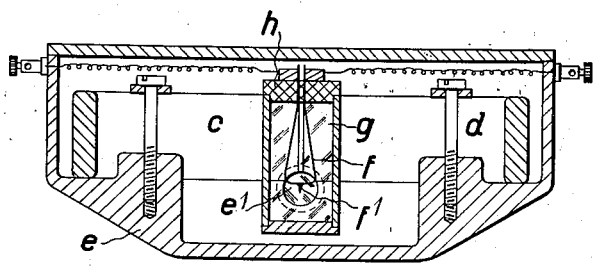
Figure 5:
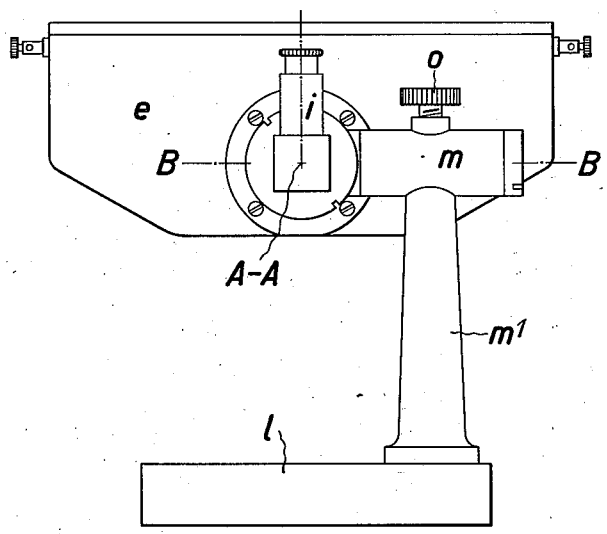

The fundamental idea of the invention is diagrammatically shown in Fig. 1 of the annexed drawing; Figs. 2 to 5 show a constructional example, viz, Fig. 2 is a plan view in which the lid of the casing has been taken off, Fig. 3 is a cross-section on line 3—3 in Fig. 2, Fig. 4 is a front view of a single part and Fig. 5 is an elevational view taken from the bottom of Fig. 2 and looking upward.

In the case shown in Fig. 1 the magnetic field is produced by a magnet, indicated by the parts of its pole $a^1$ and $a^2$. The loop conductor is denoted by $b$.

In the example shown in Figs. 2 to 5 the magnetic field is produced by two magnets $c$ and $d$ which are fixed in a casing $e$ and so disposed that a north-pole $n$ and a south pole $s$ each face each other. Between the poles of both magnets a loop conductor $f$ consisting of a thin metal band is suspended in a special protecting casing which is shut off on the sides parallel to the loop plane by two glass plates $g$ each and on its upper side by a plate $h$ which does not conduct the electric current. For the observation of the deflections of the loop a microscope $i$ is provided having an optical axis bent at right angles, which microscope is adjusted to a mark $f^1$ disposed at the bottom end of the loop $f$. The illumination of this mark is effected through a window $e^1$ disposed in a wall of the casing $e$. In order to be able to alter at will the position of the loop $f$ in space the casing $e$ can be rotated about an axis A—A, perpendicular to the loop plane, by means of a pivot $j$ within a sleeve $k$ which is on its part rotatable about a horizontal axis B—B, directed perpendicularly to the axis A—A, by means of a pivot $k^1$ within a sleeve $m$, fixed by a standard $m^1$ on a base plate $l$. For fixing the sleeve $m$ on the pivot $k^1$ a set screw $o$ is employed. By rotating the casing $e$ with the pivot $j$ in the sleeve $k$, viz, about the axis A—A, the point of suspension of the loop $f$, as observed in Fig. 3, moves to the left or to the right and besides owing to the dead weight of the loop $f$ the mark $f^1$ also deflects in the same direction thus changing its position relatively to the axis of the microscope $i$. By rotating the casing $e$ with the pivot $k^1$ in the sleeve $m$, viz, about the axis B—B, the plane of the loop $f$ is brought into an oblique position and, on the loop being deflected by a current, only a part of the weight of the loop $f$ counteracts such a deflection, thus the sensitiveness of the galvanometer being increased.

I claim:

1. In a galvanometer a casing, two magnets disposed within the casing side by side in such a manner that the magnetic lines of the one magnet are in the opposite direction to those of the other magnet, a holder fitted on the casing, and a loop-shaped conductor fixed with its two ends on this holder and being located with one of its members between the poles of the one magnet and with the other of its members between the poles of the other magnet, the plane containing the said conductor being perpendicular to the magnetic lines of the said magnets.

2. In a galvanometer a casing, two magnets disposed within the casing side by side in such a manner that the magnetic lines of the one magnet are in the opposite direction to those of the other magnet, a holder fitted on the casing, a loop-shaped conductor fixed with its two ends on this holder and being located with one of its members between the poles of the one magnet and with the other of its members between the poles of the other magnet, and a base plate, the said casing being disposed on this base plate rotatably about an axis directed horizontally and parallelly to the plane of the loop, the plane containing the said conductor being perpendicular to the magnetic lines of the said magnets.

3. In a galvanometer a casing, two magnets disposed within the casing side by side in such a manner that the magnetic lines of the one magnet are in the opposite direction to those of the other magnet, a holder fitted on the casing, and a loop-shaped conductor fixed with its two ends on this holder and being located with one of its members between the poles of the one magnet and with the other of its members between the poles of the other magnet, the said holder being rotatable relatively to the base plate about an axis perpendicular to the plane of the loop, the plane containing the said conductor being perpendicular to the magnetic lines of the said magnets.

4. In a galvanometer a casing, two magnets disposed within the casing side by side in such a manner that the magnetic lines of the one magnet are in the opposite direction to those of the other magnet, a holder fitted on the casing, a loop-shaped conductor fixed with its two ends on this holder and being located with one of its members between the poles of the one magnet and with the other of its members between the poles of the other magnet, the plane containing the said conductor being perpendicular to the magnetic lines of the said magnets, and a microscope fitted to the said casing and allowing of observing the said conductor.

ROBERT MECHAU.